March 20, 1962 J. Z. DE LOREAN 3,025,721
TRANSMISSION
Filed Aug. 7, 1959
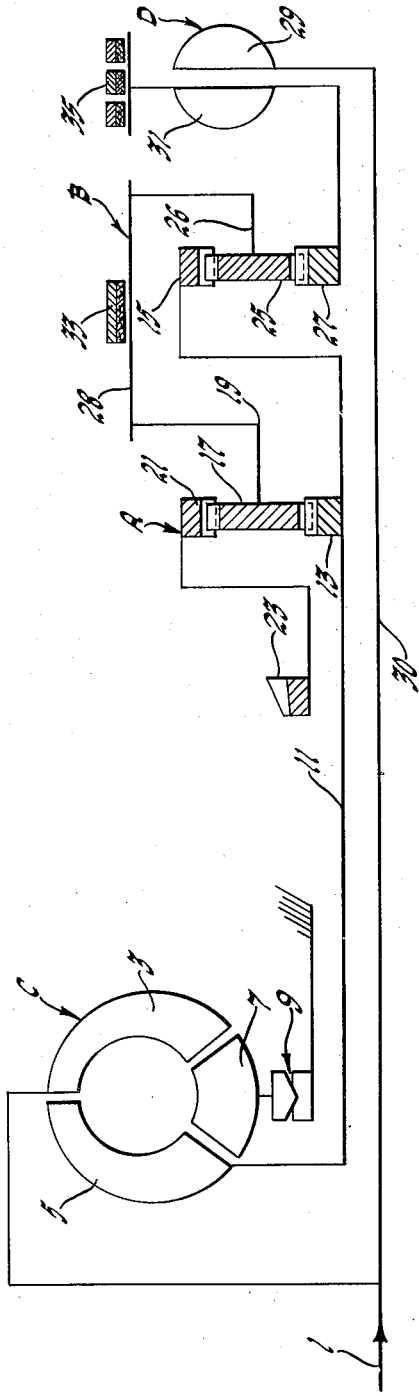
INVENTOR.
John Z. DeLorean
BY
Robert B. Gerhardt
ATTORNEY

United States Patent Office 3,025,721
Patented Mar. 20, 1962

---

3,025,721
TRANSMISSION
John Z. De Lorean, Birmingham, Mich., assignor to General Motors Corporation, Detroit, Mich., a corporation of Delaware
Filed Aug. 7, 1959, Ser. No. 832,328
4 Claims. (Cl. 74—677)

This invention relates to motor vehicle transmission and more particularly automatic transmissions employing both hydraulic and mechanical torque multiplication.

It is desirable that automatic transmissions used in motor vehicles provide a high degree of efficiency with resulting economical operation and at the same time provide gradual and smooth transition between gear ratios. The efficiency is best obtained from mechanical gear multiplication such as gearing whereas the second desired result is best obtained through hydraulic torque converter and fluid controlled ratio changing means. Where hydraulic torque transmitting elements are used in the transmission it is advantageous to provide some auxiliary braking means to aid the engine in slowing down the vehicle when coasting.

It is therefore an object of this invention to provide a transmission employing a hydraulic torque converter for smooth infinitely variable torque ratio changes in combination with mechanical gearing controlled by gradually applied fluid torque transmitting means.

It is a further object of the invention to provide such a transmission wherein during most normal driving conditions a portion of the torque transmitted between the engine and the drive wheels passes through a hydraulic torque converter and the remainder of the torque passes through a high efficiency fluid coupling means.

It is still the further object of the invention to utilize a fluid torque transmitting element of the transmission as an auxiliary braking means to aid the engine in slowing the vehicle.

Referring now to the FIGURE 1 which schematically illustrates one embodiment of the invention, the transmission has input shaft 1 adapted to be driven by the vehicle engine. The shaft 1 is connected to rotate an impeller member, represented by the vane 3 in the figure, to circulate working fluid in a toroidal path in a conventional three element hydrodynamic torque converter C. The torque converter has a turbine element represented by vane 5 and a reaction stator element represented by vane 7. The stator 7 is prevented from reverse rotation by a one-way device schematically illustrated as a ratchet member 9, the inner member of which is secured to a stationary portion of the transmission.

The turbine rotor 5 is connected by an intermediate shaft 11 to a sun gear 13 of a planetary gear unit generally designated A, and to a ring gear 15 of a second planetary gear unit generally designated B. The first gear unit A also includes a plurality of planetary pinions 17 journaled on a carrier member 19 and meshing with sun gear 13 and an output ring gear 21. Ring gear 21 is connected to drive a pinion gear 23 of a conventional differential gear unit physically located between torque converter C and the gear units A and B.

The second or rear gear unit B is similar to gear unit A and in addition to the ring gear 15 includes a plurality of planetary pinions 25 journaled on a carrier member 26 and meshing with a sun gear 27. The gear member 26 is connected by a drum 28 to the carrier member 19 of gear unit A.

The input shaft 1 in addition to being connected to drive the torque converter impeller 3, is drivingly connected through an intermediate shaft 30 to a vaned rotor 29 of a fluid coupling, generally designated D, which also includes a vaned turbine member 31 connected to the sun gear 27 of the gear set B. The fluid coupling D is of the fill and empty type, and as the coupling is filled with hydraulic fluid, a gradual torque transmission is established between shaft 30 and the coupling rotor 31 and connected sun gear 27. The drum 28, connected to both the carrier members 19 and 26, can be held against rotation by a friction band 33. Similarly the sun gear 27 and associated coupling element 31 can be held against rotation by a multiple wrap friction band 35.

*Operation*

To start the vehicle the low band 35 is applied by suitable means, not shown, to hold the sun gear 27 against rotation, the reverse band 33 is disengaged to allow the carrier drum to rotate freely, and the fill and empty coupling D is empty so that no drive is transmitted between the rotor elements 29 and 31. Under this start condition all the drive from the input shaft 1 is through the torque converter C wherein the impeller 3 drives the turbine member 5 at torque multiplication provided by reaction element 7 in the usual manner.

Turbine 5 drives sun gear 13 and ring gear 15 of gear units A and B respectively. With sun gear 27 held against rotation, forward drive of ring gear 15 causes a reduced forward speed drive of carrier member 26 and carrier 19 of unit A. With the sun gear 13 of gear unit A rotating at the speed of turbine member 5 and the carrier member 19 being rotated at a reduced speed equal to the gear ratio of gear set B, the output ring gear 21 will be driven and will drive the differential pinion member 23 at a still lower speed.

As the speed of the turbine member 5 increases and the load on the same decreases, torque multiplication in the torque converter C will decrease. At some predetermined speed the fill and empty coupling D is filled in known manner to begin to transmit torque between input shaft 1 and the sun gear 27 directly through coupling elements 29 and 31. At the same time the low band 35 is released. Since the band 35 is of the self-energizing type, the forward drive of the sun gear 27 begins gradually as the coupling D is filled. Thereafter, the sun gear 27 will be driven at approximately the same speed as the input shaft 1 any speed difference being due solely to the slip in the coupling D. At the same time the ring gear 15 is driven at approximately the speed of the input shaft 1 any speed difference being due solely to the slip in the torque converter C. With both the ring gear 15 and sun gear 27 driven at approximately the speed of the input shaft 1, the carrier member 26 is driven at the same speed. This results in the carrier member 19 of gear set A being driven at substantially the same speed of the sun gear 13 causing the output ring gear 21 to rotate at approximately this same speed.

For reverse operation the low band 35 is released and the reverse band 33 is applied by suitable means, not shown. The coupling D is emptied during reverse drive. With the carrier member 19 held against rotation by reverse band 33, forward drive of the sun gear 13 by the turbine 5 causes a reverse reduced speed drive of the output ring gear 21. Since sun gear 27 of gear unit B is no longer held by the low band 35, nor is driven by the coupling D, the gear unit B does not function in reverse drive.

During the above two path or split torque operation, that is when the torque from the input shaft 1 is split between the torque converter and the coupling D, additional vehicle braking can be obtained during vehicle coast by applying the low band 35. This acts to prevent rotation of the coupling element 31 and the sun gear 27. Through a churn brake action the coupling element 29 is slowed resulting in lower speed rotation of the engine and the impeller 3 of the torque converter. Through further churn brake action in the torque converter C the turbine 5 is slowed and through the gear units A and B the output shaft 21 and pinion 23 act to slow the vehicle. Holding of the sun gear 27 by the low band 33 also causes the gear units A and B to drive the turbine 5 at an increased speed from the output gear 21.

It will be seen that the invention provide for a relatively simple transmission having economic and efficient operating characteristics, coupling with smooth gear ratio changes and auxiliary coast braking features. Changes and other arrangements will be apparent to those skilled in the art, as the illustrated embodiment is only representative, and such changes may be made without departing from the spirit and scope of the invention, which is to be limited only by the following claims.

I claim:
1. A multi-speed transmission for a motor vehicle including an input shaft connected to drive a fluid impeller of a fluid torque transmitting device, a fluid turbine adjacent to said impeller, a pair of planetary gear sets each having a sun gear, a ring gear, and planet pinions meshing with the sun and ring gears and mounted on a carrier member, first means connecting said turbine to the sun gear of one gear set and to the ring gear of the other gear set, said carrier members connected to each other, an output shaft connected to the ring gear of said one gear set, first releasable means for holding the sun gear of said other gear set to provide gear reaction for reduced speed forward drive between said turbine and said output shaft, and second means including a second releasable means independent of said first means connecting said input shaft with the sun gear of said other gear set to provide a split torque drive path including said first and second means between said input shaft and said output shaft.

2. A multi-speed transmission for a motor vehicle including an input shaft connected to drive a fluid impeller of a fluid torque transmitting device, a fluid turbine adjacent to said impeller, a pair of planetary gear sets each having a sun gear, a ring gear, and planet pinions meshing with said sun and ring gears and mounted on a carrier member, first means connecting said turbine to the sun gear of one gear set and to the ring gear of the other gear set, said carrier members connected to each other, an output shaft connected to the ring gear of said one gear set, releasable means for holding the sun gear of said other gear set to provide gear reaction for reduced speed forward drive between said turbine and said output shaft, and controllable fluid coupling means connecting said input shaft with the sun gear of said other gear set independently of said first means to provide a split torque drive path between said input shaft and said output shaft.

3. A multi-speed transmission for a motor vehicle including an input shaft connected to drive a fluid impeller of a fluid torque transmitting device, a fluid turbine adjacent to said impeller, a pair of planetary gear sets each having a sun gear, a ring gear, and planet pinions meshing with said sun and ring gears and mounted on a carrier member, said turbine connected to the sun gear of one gear set and to the ring gear of the other gear set, said carrier members connected to each other, an output shaft connected to the ring gear of said one gear set, first releasable means for holding the sun gear of said other gear set to provide gear reaction for reduced speed forward drive between said turbine and said output shaft, second releasable means connecting said input shaft with the sun gear of said other gear set to provide a split torque drive path between said input shaft and said output shaft, said split torque drive path including said fluid torque transmitting device and said second releasable means, and releasable holding means for said carrier members to provide gear reaction for reverse drive between said input shaft and said output shaft.

4. A multi-speed transmission for a motor vehicle including an input shaft connected to drive a fluid impeller of a fluid torque transmitting device, a fluid turbine adjacent to said impeller, a pair of planetary gear sets each having a sun gear, a ring gear, and planet pinions meshing with said sun and ring gears and mounted on a carrier member, first means for connecting said turbine to the sun gear of one gear set and to the ring gear of the other gear set to establish a first torque path including said fluid torque transmitting device between said input shaft and said gear sets, said carrier members connected to each other, an output shaft connected to the ring gear of said one gear set, first releasable means for holding the sun gear of said other gear set to provide gear reaction for reduced speed forward drive between said turbine and said output shaft, releasable fluid coupling means connecting said input shaft with the sun gear of said other gear set to provide a second torque drive path between said input shaft and said gear sets when said first releasable means is released and to provide hydrodynamic braking for said input shaft when said first releasable means is engaged.

References Cited in the file of this patent

UNITED STATES PATENTS

| | | |
|---|---|---|
| 2,162,803 | England | June 20, 1939 |
| 2,748,622 | Syrovy et al. | June 5, 1956 |
| 2,851,906 | De Lorean | Sept. 16, 1958 |
| 2,861,474 | Moore | Nov. 25, 1958 |